Figure 3:
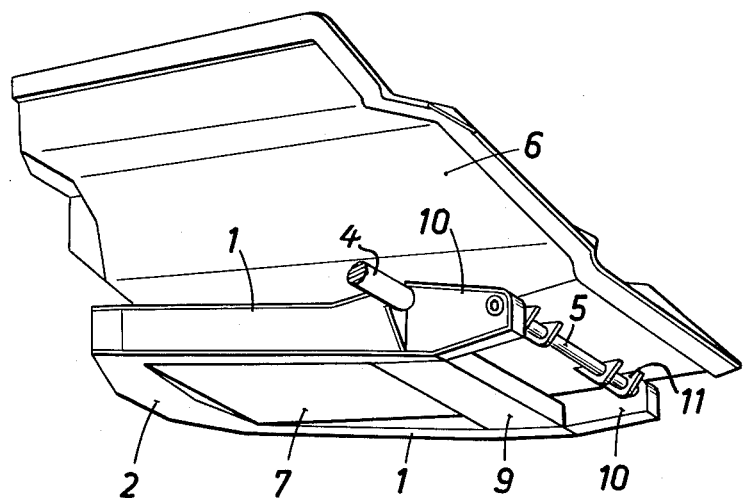

Oct. 19, 1965 ÅKE MALMGREN 3,212,818
DUMPING TRAILER

Filed March 1, 1963 2 Sheets-Sheet 1

FIG.1.

FIG.2.

Inventor
Åke Malmgren
by Sommers + Young
Attorneys

Oct. 19, 1965  ÅKE MALMGREN  3,212,818
DUMPING TRAILER

Filed March 1, 1963  2 Sheets-Sheet 2

Inventor
Åke Malmgren
by Sommers & Young
Attorneys

3,212,818
DUMPING TRAILER
Åke Malmgren, Tvargatan 5, Kiruna, Sweden
Filed Mar. 1, 1963, Ser. No. 262,043
1 Claim. (Cl. 298—5)

The present invention has reference to transportation vehicles of the type comprising the combination of a power vehicle, a load carrying vehicle or trailer, and a pivotal connection therebetween. More particularly the invention has reference to trailers for such combined vehicles which comprise a wheeled frame and a body tiltably mounted in said frame.

An object of the invention is to provide an improved trailer of said type, the body of which has a large loading capacity as compared with that of trailers of conventional structure of the same external dimensions.

A feature of the invention is that the axis of tilting of the body is positioned behind the wheel axle or rear wheel axle of the trailer on a lower level than said wheel axle.

Another feature of the invention is that the end of the body remote from the axis of tilting, that is to say, the fore end of the body, is resiliently supported by the fore end member of the trailer frame, that is to say the end facing the power vehicle.

Because of the low positioning of the axis of tilting the body of the trailer does only require a minimum of height for the depositing of a maximum load. Since the fore end of the trailer body is supported by the fore end member of the trailer frame it will be feasible to lower the trailer body down into between the side members of the trailer frame, thereby allowing the use of a body having an increased loading capacity at unchanged height as compared with that of a body conventionally resting to all its extent on the top of the trailer frame.

In the accompanying drawings an embodiment of the invention is illustrated by way of example.

FIG. 1 is a side elevation of a two-wheel trailer according to the invention. FIG. 2 is an end view of the trailer looking from the open, or rear, end thereof. FIG. 3 is a perspective view of the trailer looking from below.

It is to be noted that detail elements not necessary to be illustrated for explaining the invention have been removed from the drawing or only diagrammatically indicated.

The trailer according to the invention is adapted, as is already pointed out hereinbefore, to be drawn by a tractor or other power vehicle, to which the trailer is articulated by means of a vertical pivotal shaft.

The frame of the trailer comprises two longitudinally extending side members 1, a cross-extending fore end member 2 and a cross-extending rear end member 9 situated at a distance from the rear ends of the side members of the frame 1 as shown in FIG. 3. Thus, the side members 1 of the frame may be said to be formed with a pair of end portions 10 projecting beyond the rear end member 9.

The frame is carried by a pair of wheels only indicated, at 3, in FIGS. 1 and 2 of the drawing. The wheels are mounted on individual axles, not shown, each of which is adapted to be mounted in the respective side member 1 of the frame at a point above the rear end member 9.

The free ends 10 of the frame projecting beyond the wheel axles, indicated at 4, support a hinge pin 5 forming the tilting shaft of the body 6 of the trailer. Said hinge pin is situated on a lower level than the centers 4' of the wheel axles, the body itself being so constructed that its bottom portion may be lowered a certain distance down into between the side members 1 of the frame with its bottom 7 somewhat lower than the centers of the wheel axles.

The side walls 12, 13 of the body flare outwardly upwardly from its bottom 15, as indicated by numeral 16, to a position just higher than and adjacent the wheels, whereupon said sides extend laterally over the wheels as indicated at 17 to locations 18 approximately in the planes of the outer sides of the wheels where said sides then turn upwardly to their upper extremities, as shown at 19 (FIG. 2).

The mounting of the body 6 on the hinge pin may take various forms. In the drawing there are shown a member of ears 11 welded to the bottom portion of the body and rotatably surrounding the hinge pin 5.

As reckoned from its comparatively narrow flat bottom portion 7 the body widens upwardly and laterally so as to extend over the wheels 3, as shown in FIG. 2.

It is to be noted that the body does not rest on the side members of the frame by its widened side walls but is supported except by the hinge pin 5, only by supports 8 resiliently mounted on the fore end member 2 of the frame.

Said supports 8 are so constructed and arranged as to maintain the bottom portion and the side walls of the body out of contact with the side members of the frame, when the body carries maximum or full load.

Due to the lowering of the bottom portion of the body into between the side members of the frame a body will result having a large loading capacity as compared with conventional bodies, without increasing the height of the body. This is of importance especially as far as the transportation of goods in narrow passages, such as mine drifts or tunnels, is concerned.

Another circumstance of importance for such transportation is the placing of the tilting shaft on a low level, since this will result in a reduction to a minimum of the height required for allowing the tilting of a given size of body.

The description hereinbefore given and the drawings referred to therein do only relate to an example of the various forms the invention may take into practice. Thus, the invention may be applied to trailers having four or more wheels as well as to trailers having but a single pair of wheels, as the one illustrated. Also the details of the structure may be modified within the scope of the annexed claim.

I claim:

A trailer structure, adapted to be drawn by a power vehicle, comprising in combination a rigid frame including rigid side members, rigid fore and rear transversely extending members, and said side members having extensions projecting beyond said rear transversely extending member, said rear member being at a lower level than the upper edge of said side members, a pair of wheels and associated axles for supporting said frame at points above and closely adjacent said rear end member of the frame whereby said frame is rigidly braced at the location of said wheel axles, a dump body comprising a flat bottom portion, side wall members and a fore end wall member, a hinge pin extending between the extension of said side member of the frame at a lower level than that of the wheel axles for tiltably connecting the body to the frame, the bottom portion of said body being located lower than the upper edge of said side members and lower than said wheel axles and said side walls of said body being shaped so as to conform to the contour of the space between said side members of the frame and the space between the wheels, and diverging upwardly and projecting laterally above the wheels, supports resiliently mounted on the front end member of the frame for yieldingly supporting the body, while preventing it, when fully loaded, from touching said side members of the frame by its bottom portion and side wall members.

References Cited by the Examiner

UNITED STATES PATENTS

| | | | |
|---|---|---|---|
| 774,771 | 11/04 | Mills | 298—17 |
| 2,148,798 | 2/39 | Barrett | 298—20 |
| 2,752,193 | 6/56 | Kling | 298—5 X |

FOREIGN PATENTS

| | | |
|---|---|---|
| 203,878 | 12/57 | Austria. |
| 364,399 | 12/38 | Italy. |

ARTHUR L. LA POINT, *Primary Examiner.*

RALPH D. BLAKESLEE, MILTON BUCHLER, *Examiners.*